(12) United States Patent
Crawford et al.

(10) Patent No.: US 8,444,201 B1
(45) Date of Patent: May 21, 2013

(54) PULL OUT, FOLD DOWN TAILGATE STEP HAVING FOLD UP HANDLE

(76) Inventors: Marc A. Crawford, Colorado Springs, CO (US); Marilyn A. Burnfield, Warren, OH (US)

( * ) Notice: Subject to any disclaimer, the term of this patent is extended or adjusted under 35 U.S.C. 154(b) by 0 days.

(21) Appl. No.: 13/439,484

(22) Filed: Apr. 4, 2012

(51) Int. Cl.
*B60P 9/00* (2006.01)

(52) U.S. Cl.
USPC ............................................. 296/62; 296/50

(58) Field of Classification Search
USPC ...................... 296/50, 57.1, 63, 62
See application file for complete search history.

(56) References Cited

U.S. PATENT DOCUMENTS

| | | | | |
|---|---|---|---|---|
| 4,639,032 A | * | 1/1987 | Barbour | 296/62 |
| 6,270,139 B1 | * | 8/2001 | Simpson | 296/62 |
| 2002/0070577 A1 | * | 6/2002 | Pool et al. | 296/62 |
| 2010/0089698 A1 | * | 4/2010 | Brodsack | 296/62 |

* cited by examiner

*Primary Examiner* — Lori Lyjak
(74) *Attorney, Agent, or Firm* — G F. Gallingen

(57) ABSTRACT

A tail gate step for mounting on a tailgate of a pickup truck comprising: i) a base having a downwardly folded rear side portion adapted seat on, the tailgate on the pickup truck; ii) spaced apart parallel slides positioned within a track mounted on the base; iii) step carrying side fold down members each having a top end portion pivoted adjacent to an inner side portion of a rear end portion of a parallel slide; iv) a fold down foot step member having an inner end portion pivoted to bottom end portions of the fold down members; v) folding step stops; and, vi) slide stops limiting forward and rearward movement of the slide within the track, so that the rear position defines an operative position wherein the step side fold down members rotate into a downwardly extending position adjacent to the folded rear side portion of the base.

Figure 1:
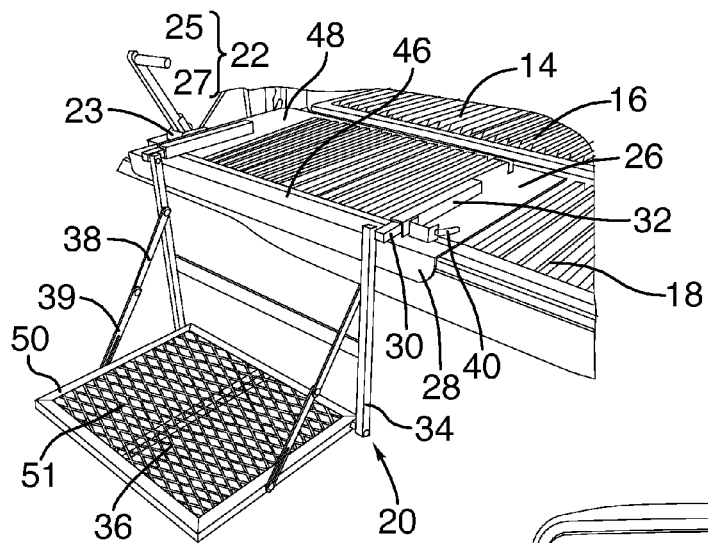

7 Claims, 1 Drawing Sheet

PULL OUT, FOLD DOWN TAILGATE STEP HAVING FOLD UP HANDLE

FIELD OF THE INVENTION

This invention relates to a tailgate step for a pickup truck, used to facilitate loading and unloading cargo carried in the bed of the pickup truck. More particularly this invention relates to a pull out and fold down tailgate step attached to an interior side portion of the tailgate. The step is completely unseen from the exterior of the pickup truck when the tailgate is in a closed position. The tailgate step also includes a fold up handle.

BACKGROUND OF THE INVENTION

The bed of a pickup truck is generally a few feet above ground level. This height prevents a user from readily stepping into the cargo bed from the ground in order to carry a load to the front portion of the pickup bed. While a user is able to climb onto the bed from the ground he is not able to do this without using his arms. While he can lift a load onto the tailgate from the ground, he is unable to shift that load from the tailgate to the front of the truck bed to allow the truck bed to be filled or the load to be secured. He is unable to carry even a small load while climbing onto the pickup truck bed from ground level. What is needed is a step between ground level and the level of the pickup bed, to allow a user to step up, or down in an erect position, carrying a load in his arms, either onto or off of the pickup truck bed.

The height of a pickup bed generally ranges between 2½ and 3 feet. This is substantially more than the height of a standard step. With a step height which is substantially more than the height of a standard step, there is an increased need to have an elevated handle beside the step to maintain balance and to pull oneself up onto the pickup bed. This need to maintain balance is an important safety concern. Falling from the height of the pickup bed, or even the height of the step could result in serious injury.

Most pickup trucks are sold at a price which indicates that the purchaser is significantly concerned not only with function, but with appearance. He does not want is truck to look other than sporty in order to facilitate its work functionality when it is only used to haul paraphernalia a few percent of the time. There is an unmet need to provide a pickup step which is generally inconspicuous when the tailgate is closed, or when the tailgate is in its normal operable position.

OBJECTS OF THE INVENTION

It is an object of this invention to disclose a tailgate step having a fold up handle which is completely unseen from the exterior of the pickup when the tailgate is in a closed position. It is an object of this invention to disclose a fold down tailgate having a fold up safety handle to facilitate safe ingress and egress from the truck bed. It is yet a further object of this invention to disclose a tailgate step which minimally interferes with cargo space in the truck bed.

One aspect of this invention provides for a tail gate step for mounting on a swing down tailgate of a pickup truck comprising: i) a generally planar base having a downwardly folded rear side portion adapted to attach to, seat on, and extend over a top edge portion of the swing down tailgate on the pickup truck; ii) spaced apart parallel slides each having a length which is aligned with a length of the truck, positioned within a track mounted on the base; iii) step carrying side fold down members each having a top end portion pivoted adjacent to an inner side portion of a rear end portion of a parallel slide; iv) a fold down, generally rectangular foot step member having an inner end portion of its opposite outer side portions pivoted to bottom end portions of the fold down members; v) folding step stops each having a lower bottom end portion pivotably attached to an outer rear side edge portion of the step, and an upper top end portion pivotably attached to an inner side portion of the top end portion of the fold down members; and, vi) slide stops limiting forward and rearward movement of the slide within the track, so that the forward movement defines a storage position wherein the step is prevented from contacting the truck bed, and the rear position defines an operative position wherein the pivot on the rear end portion of the slide allows the step side fold down members to rotate into a downwardly extending position adjacent to the folded rear side portion of the base. After the truck tailgate is swung down to an open position, the truck foot step member can be slid back moving the spaced apart slides from a forward storage position within the tracks to an extreme rear operative position, and thereafter the foot step member, pivoted within a rear portion of the slides can be first swung up, then back, and finally down to an operative position, limited from swinging below a horizontal position by the folding step stops.

In a preferred aspect of this invention further comprises a pivoted safety handle having a lower arm end portion pivotably attached to a bracket mounted on the base and an upper arm portion carrying a grasped portion which extends generally perpendicular to the arm portion, and further a handle swing stop comprising a sliding latch pin mounted within a bracket on the base, which engages within a cylindrical hole to maintain the handle in an elevated operative position.

Various other objects, advantages and features of this invention will become apparent to those skilled in the art from the following description in conjunction with the accompanying drawings.

FIGURES OF THE INVENTION

FIG. 1 is a perspective view of a tailgate fold down step in a slid out, and folded down operative position. The safety handle is shown in an operative swung up position.

Figure 2:
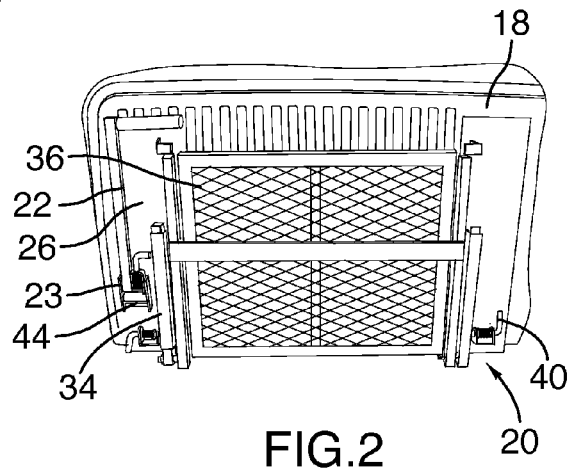

FIG. 2 is a perspective view of the tailgate fold down step shown in FIG. 1 in a folded up position. When the step is fully pushed back it will then be in a storage position. The safety handle is also in a storage position.

Figure 3:
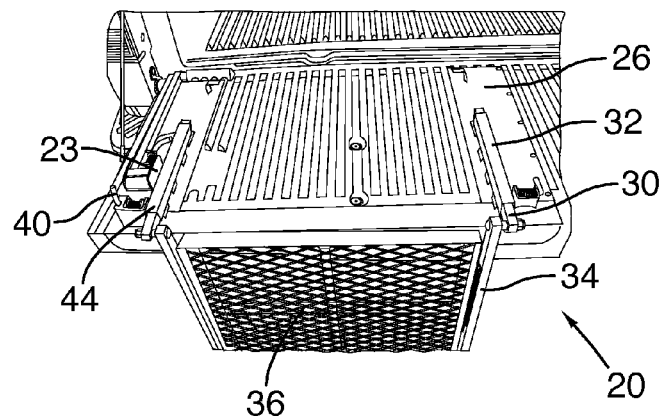

FIG. 3 is a perspective view of the tailgate fold down step shown in FIG. 2. The tailgate foot step member has been slid back in the sliding track and it has been rotated 270 degrees, first up, then back, and then finally down.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a tailgate fold down step 20 in a slid out, and folded down operative position. The safety handle 22 is shown in an operative swung up position. FIG. 2 is a perspective view of the tailgate fold down step 20 shown in FIG. 1 in a folded up position. When the step is fully pushed back it will then be in a storage position. The safety handle 22 is also in a storage position. FIG. 3 is a perspective view of the tailgate fold down step 20 shown in FIG. 2. In FIG. 3 the tailgate foot step member 36 has been slid back in the sliding track 24 and it has been rotated 270 degrees, first up, then back, and then finally down. Most broadly, a tail gate step 20 for mounting on a swing down tailgate 18 of a pickup truck 16 comprises: i) a generally planar base 26 having a downwardly folded rear side portion 28 adapted to attach to, seat on, and extend over a top edge portion of the swing down tailgate 18 on the pickup truck 16; ii) spaced apart parallel slides 30 each having a length which is aligned with a length of the truck 16, positioned within a track 32 mounted on the base 26; iii) step carrying side fold down members 34 each having a top end portion pivoted adjacent to an inner side portion of a rear end portion of a parallel slide 32; iv) a fold down, generally rectangular foot step member 36 having an inner end portion of its opposite outer side portions pivoted to bottom end portions of the fold down members 34; v) folding step stops 38 each having a lower bottom end portion pivotably attached to an outer rear side edge portion of the step member 36, and an upper top end portion pivotably attached to an inner side portion of the top end portion of the fold down members 34; and, vi) slide stops limiting forward and rearward movement of the slide 30 within the track 32, so that the forward movement defines a storage position wherein the foot step member 36 is prevented from contacting the truck bed 14, and the rear position defines an operative position wherein the pivot on the rear end portion of the slide 30 allows the step side fold down members 34 to rotate into a downwardly extending position adjacent to the folded rear side portion of the base 26. After the truck tailgate 18 is swung down to an open position, the truck step 36 can be slid back moving the spaced apart slides 30 from a forward storage position within the tracks 32 to an extreme rear operative position, and thereafter the truck step 36, pivoted within a rear portion of the slides 30 can be first swung up, then back, and finally down to an operative position, limited from swinging below a horizontal position by the folding step stops 38.

In a preferred embodiment the tail gate step 20 further comprises a pivoted safety handle 22 having a lower arm portion 27 pivotably attached to a bracket 23 mounted on the base 26 and an upper aim portion 27 carrying a grasped portion 25 which extends generally perpendicular to the arm portion 27, and further a handle swing stop comprising a sliding latch pin mounted within a bracket on the base, which engages within a cylindrical hole 44 extending to maintain the handle 22 in an elevated operative position. In the most preferred embodiment the lower end portion 27 of the swinging handle 22 is pivoted to a front portion of the base 26 attached to the tailgate 18, and where two handle swing stop positions are provided, one to lock the swinging handle 22 in a storage position adjacent to the base 26, and the other to lock the swinging handle 22 in an elevated operative position. Most preferably, the slide stops and handle stops both comprise sliding latch pins 44 carried within a bracket mounted to the base 26, said stops biased to an engaged position, so that when the slides 30 move to either the storage or operative position the pins 40 will engage within a mating cylindrical hole 44 in the slide 30 and tracks 32, or handle 22 respectively.

Most preferably, the base 26 is fabricated from an angle 46 having a length substantially longer than a width of the rectangular step 36, and two plates 48 adapted to attach to and seat on the tailgate 18 beneath the spaced apart parallel tracks 32, and wherein the tracks 32 comprise square tubing, and wherein the slides 30 and step side fold down members 34 have a generally square exterior cross section. The rectangular step 36 is fabricated from angle iron 50 and expanded metal 51. In the most preferred embodiment of the invention the lower bottom end portion of the folding step stops 38 further comprise an elongate internal slot 39 having a lower end portion which terminates on the pivot attached to the outer rear side edge portion of the foot step member 36 to accommodate non precise end attachments of the folding step stops 38.

While the invention has been described with preferred specific embodiments thereof, it will be understood that this description is intended to illustrate and not to limit the scope of the invention, which is defined by the following claims.

We claim:

1. A tail gate step for mounting on a swing down tailgate of a pickup truck comprising:
    i) a generally planar base having a downwardly folded rear side portion adapted to attach to, seat on, and extend over a top edge portion of the swing down tailgate on the pickup truck;
    ii) spaced apart parallel slides each having a length which is aligned with a length of the truck, positioned within a track mounted on the base;
    iii) step carrying side fold down members each having a top end portion pivoted adjacent to an inner side portion of a rear end portion of a parallel slide;
    iv) a fold down, generally rectangular foot step member having opposite outer side portions of an inner end portion pivoted to bottom end portions of the fold down members;
    v) folding step stops each having a lower bottom end portion pivotably attached to an outer rear side edge portion of the step, and an upper top end portion pivotably attached to an inner side portion of the top end portion of the fold down members; and,
    vi) slide stops limiting forward and rearward movement of the slide within the track, so that the forward movement defines a storage position wherein the step is prevented from contacting the truck bed, and the rear position defines an operative position wherein the pivot on the rear end portion of the slide allows the step side fold down members to rotate into a downwardly extending position adjacent to the folded rear side portion of the base;
    so that after the truck tailgate is swung down to an open position, the foot step member can be slid back moving the spaced apart slides from a forward storage position within the tracks to an extreme rear operative position, and thereafter the foot step member, pivoted within a rear portion of the slides can be first swung up, then back, and finally down to an operative position, limited from swinging below a horizontal position by the folding step stops.

2. The tailgate step as in claim 1 further comprising a pivoted safety handle having a lower arm portion pivotably attached to a handle bracket mounted on the base and an upper arm portion carrying a grasped portion which extends generally perpendicular to the arm portion, and further a handle swing stop comprising a sliding latch pin mounted within the handle bracket on the base, which engages within a cylindrical hole to maintain the handle in an elevated operative position.

3. The tailgate step as in claim 2 wherein the lower end portion of the swinging handle is pivoted to a front portion of the base attached to the tailgate, and where two handle swing stop positions are provided, one to lock the swinging handle in a storage position adjacent to the base, and the other to lock the swinging handle in an elevated operative position.

4. The tailgate step as in claim 1 wherein the slide stops and handle stops both comprise sliding latch pins carried within a bracket mounted to the base, said stops biased to an engaged position, so that when the slides move to either the storage or operative position the pins will engage within a mating cylindrical hole in the slide and tracks, or handle respectively.

5. The tailgate step as in claim 1 wherein the base is fabricated from an angle having a length substantially longer than a width of the rectangular step, and two plates adapted to attach to and seat on the tailgate beneath the spaced apart parallel tracks, and wherein the tracks comprise square tubing, and wherein the slides and step side fold down members have a generally square exterior cross section.

6. The tailgate step as in claim 5 wherein the rectangular step is fabricated from angle iron and expanded metal.

7. The tailgate step as in claim 1 wherein the lower bottom end portion of the folding step stops further comprise an elongate internal slot having a lower end portion which terminates on the pivot attached to the outer rear side edge portion of the foot step member to accommodate non precise end attachments of the folding step stops.

\* \* \* \* \*